(12) United States Patent
Tang et al.

(10) Patent No.: US 11,966,011 B2
(45) Date of Patent: Apr. 23, 2024

(54) OPTICAL IMAGING LENS ASSEMBLY

(71) Applicant: Zhejiang Sunny Optical Co., Ltd, Ningbo (CN)

(72) Inventors: Mengna Tang, Ningbo (CN); Saifeng Lyu, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 813 days.

(21) Appl. No.: 16/992,953

(22) Filed: Aug. 13, 2020

(65) Prior Publication Data

US 2020/0371312 A1 Nov. 26, 2020

Related U.S. Application Data

(63) Continuation of application No. PCT/CN2018/106604, filed on Sep. 20, 2018.

(30) Foreign Application Priority Data

Sep. 5, 2018 (CN) .......................... 201811031673.8

(51) Int. Cl.
*G02B 13/00* (2006.01)
*G02B 9/06* (2006.01)
*G02B 27/00* (2006.01)

(52) U.S. Cl.
CPC .............. *G02B 13/002* (2013.01); *G02B 9/06* (2013.01); *G02B 27/0025* (2013.01)

(58) Field of Classification Search
CPC ........ G02B 13/002; G02B 9/06; G02B 13/06; G02B 13/0035; G02B 13/004; G02B 13/003
See application file for complete search history.

(56) References Cited

U.S. PATENT DOCUMENTS

| 9,798,115 | B1 | 10/2017 | Yin et al. |
| 2014/0128673 | A1 | 5/2014 | Cheng |
| 2016/0004049 | A1* | 1/2016 | Yin .................... G02B 13/0035 359/716 |
| 2017/0097497 | A1 | 4/2017 | Cheng et al. |

FOREIGN PATENT DOCUMENTS

| CN | 103799951 A | 5/2014 |
| CN | 106154517 | 11/2016 |
| CN | 106569321 A | 4/2017 |
| CN | 106680974 | 5/2017 |

(Continued)

OTHER PUBLICATIONS

Machine translation of CN108681039 (Year: 2018).*
International Search Report in Corresponding International Application No. PCT/CN2018/106604, dated Jun. 6, 2019; 7 pgs.

*Primary Examiner* — Alicia M Harrington
(74) *Attorney, Agent, or Firm* — HAUPTMAN HAM, LLP

(57) ABSTRACT

The present disclosure discloses an optical imaging lens assembly, which includes sequentially from an object side to an image side along an optical axis, a first lens and at least one subsequent lens having refractive power. A distance TTL along the optical axis from an object-side surface of the first lens to an image plane of the optical imaging lens assembly and a distance P along the optical axis from a to-be-captured object to the object-side surface of the first lens satisfy 0.6<TTL/P*10<1.8.

9 Claims, 11 Drawing Sheets

(56) References Cited

FOREIGN PATENT DOCUMENTS

| CN | 106680976 | | 5/2017 | |
|---|---|---|---|---|
| CN | 107656358 | A | 2/2018 | |
| CN | 207336907 | U | 5/2018 | |
| CN | 108459398 | A | 8/2018 | |
| CN | 108681039 | A * | 10/2018 | ......... G02B 13/0045 |
| CN | 208752295 | U | 4/2019 | |

\* cited by examiner

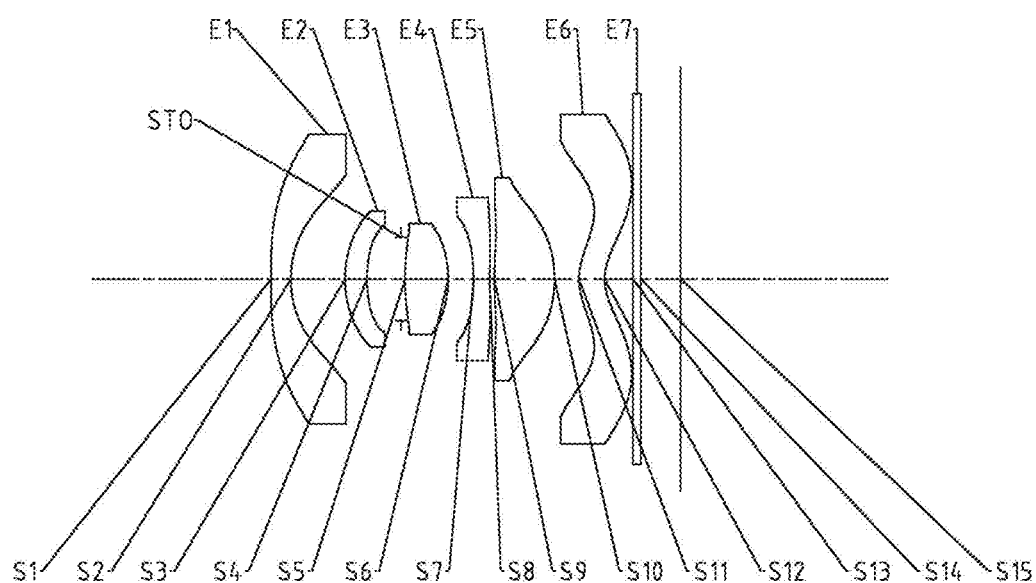
Fig. 9
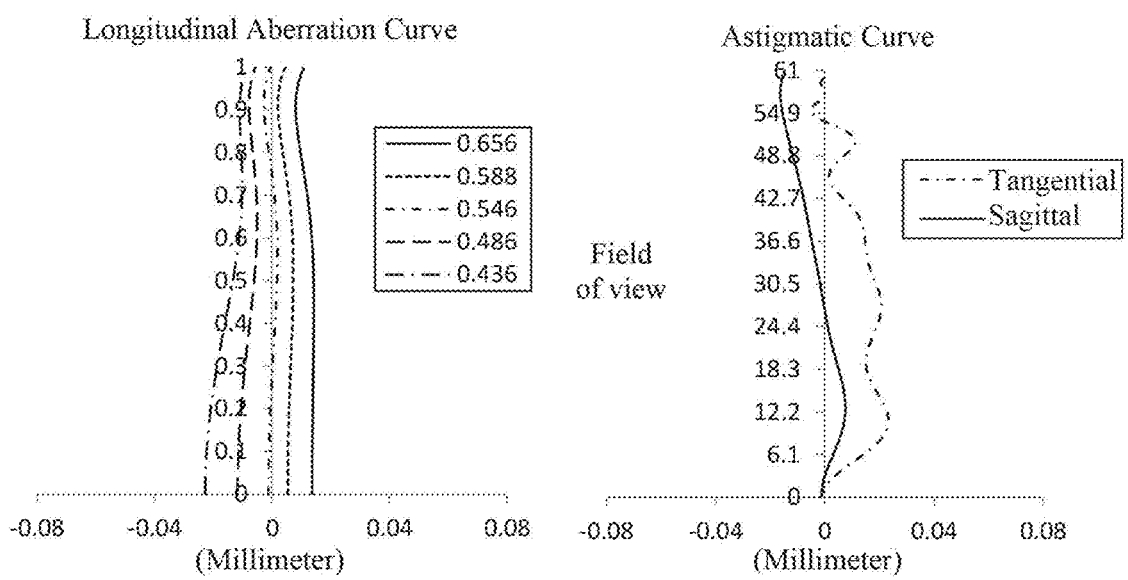
Fig. 10A
Fig. 10B

OPTICAL IMAGING LENS ASSEMBLY

CROSS-REFERENCE TO RELATED APPLICATIONS

The present patent application is a continuation of International Application No. PCT/CN2018/106604, filed on Sep. 20, 2018, which claims the priority to Chinese Patent Application No. 201811031673.8, filed before the China National Intellectual Property Administration (CNIPA) on Sep. 5, 2018. Both of the aforementioned patent applications are hereby incorporated by reference in their entireties.

TECHNICAL FIELD

The present disclosure relates to an optical imaging lens assembly, and specifically to an optical imaging lens assembly including at least two lenses.

BACKGROUND

With the continuous development of science and technology, mobile phone recognition technology has gradually changed from the initial digital password and pattern recognition technology to fingerprint recognition, iris recognition, and 3D facial recognition technology. Palmprint recognition technology is a new biometric recognition technology proposed in recent years, and it is likely to be applied to mobile phone recognition technology in the future. Correspondingly, higher demands are put forward on the corresponding optical imaging lens assemblies. For example, the optical imaging lens assemblies are required to have the characteristics of miniaturization, large viewing angle, and high imaging quality at a certain imaging distance.

SUMMARY

The present disclosure provides an optical imaging lens assembly applicable to portable electronic products, which can at least solve or partially solve at least one of the technical problems mentioned above in the prior art.

According to an aspect of the present disclosure, an optical imaging lens assembly including, sequentially from an object side to an image side along an optical axis, a first lens and at least one subsequent lens having refractive powers, is provided. A distance TTL along the optical axis from an object-side surface of the first lens to an image plane of the optical imaging lens assembly and a distance P along the optical axis from a to-be-captured object to the object-side surface of the first lens may satisfy 0.6<TTL/P*10<1.8.

In one implementation, among the first lens and the at least one subsequent lens, an object-side surface of a lens closest to the image plane of the optical imaging lens assembly may be a convex surface.

In one implementation, among the first lens and the at least one subsequent lens, a radius of curvature RLS2 of an image-side surface of the lens closest to the image plane of the optical imaging lens assembly and a radius of curvature RLS1 of the object-side surface of the lens closest to the image plane of the optical imaging lens assembly may satisfy |RLS2/RLS1|≤2.0.

In one implementation, a total effective focal length f of the optical imaging lens assembly and an effective focal length f1 of the first lens may satisfy 0.1<|f/f1|<1.3.

In one implementation, a total effective focal length f of the optical imaging lens assembly and a radius of curvature R1 of the object-side surface of the first lens may satisfy |f/R1|≤2.6.

In one implementation, an effective aperture radius DT12 of an image-side surface of the first lens and an effective aperture radius DT11 of the object-side surface of the first lens may satisfy 0.3<DT12/DT11<1.6.

In one implementation, the at least one subsequent lens may include a second lens, and an object-side surface of the second lens may be a convex surface.

In one implementation, the at least one subsequent lens may include, sequentially from the object side to the image side along the optical axis, a second lens, a third lens and a fourth lens, and an object-side surface of the fourth lens may be a convex surface.

In one implementation, a total effective focal length f of the optical imaging lens assembly and an entrance pupil diameter EPD of the optical imaging lens assembly may satisfy f/EPD≤3.0.

In one implementation, a sum of center thicknesses ΣCT along the optical axis of the first lens and the at least one subsequent lens and a distance TTL along the optical axis from the object-side surface of the first lens to the image plane of the optical imaging lens assembly may satisfy 0.2<ΣCT/TTL<0.7.

In one implementation, half of a maximal field-of-view angle HFOV of the optical imaging lens assembly may satisfy 33°<HFOV<103°.

The present disclosure employs at least two lenses, and the optical imaging lens assembly described above has at least one advantageous effect such as miniaturization, good processability, large viewing angle, and high imaging quality when the object distance is within a range from 20 mm to 80 mm, and the like by properly disposing the refractive power, the surface shape, the center thickness of each lens and the spaced distance on the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 9 is a schematic structural view of an optical imaging lens assembly according to embodiment 5 of the present disclosure;

FIGS. 10A-10D illustrate a longitudinal aberration curve, an astigmatic curve, a distortion curve and a lateral color curve of the optical imaging lens assembly according to embodiment 5, respectively;

DETAILED DESCRIPTION OF EMBODIMENTS

Figure 1:
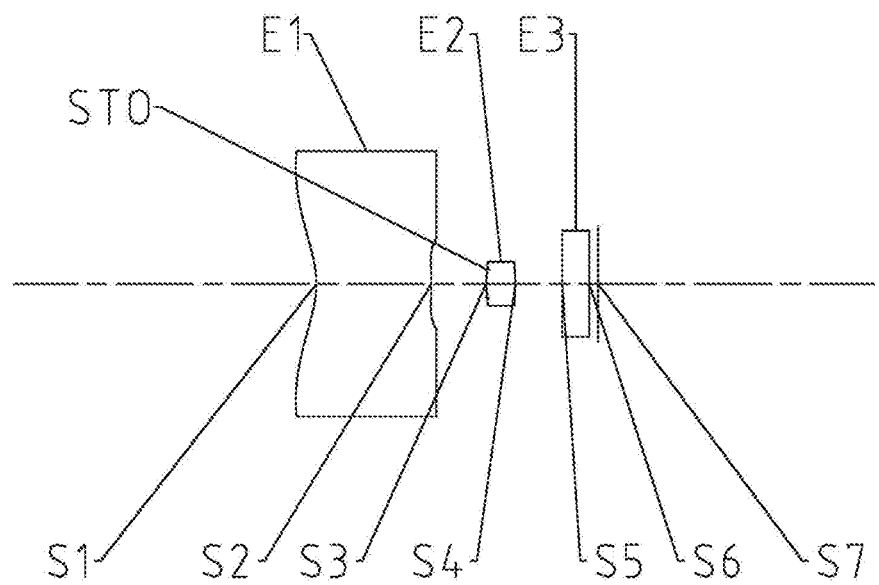
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions, such as first, second and third, are merely for distinguishing one feature from another feature without indicating any limitation on the features. Thus, a first lens discussed below could be referred to as a second lens or a third lens without departing from the teachings of the present disclosure.

In the accompanying drawings, for ease of explanation, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis, and an abaxial region refers to a region except for the region near the optical axis, i.e., a region away from the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of" when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging lens assembly according to exemplary implementations of the present disclosure includes, sequentially from an object side to an image side along an optical axis, a first lens and at least one subsequent lens having refractive power. Alternatively, an object-side surface of the lens, which is closest to the image plane, may be a convex surface. By disposing the object-side surface of the lens closest to the image plane to be a convex surface, the incident light can be further converged and the light path can be properly controlled. In one aspect, it is possible to prevent excessively large inclination angle, beneficial to reduce the risk of the generation of ghost and improve the processability of the lens assembly. In another aspect, it is possible to comprehensively correct the astigmatism of the system.

In an exemplary implementation, the optical imaging lens assembly of the present disclosure may include two lenses having refractive power, which are a first lens and a second lens. The two lenses are sequentially arranged from the object side to the image side along the optical axis, wherein an object-side surface of the second lens may be a convex surface.

In an exemplary implementation, the optical imaging lens assembly of the present disclosure may include three lenses having refractive power, which are a first lens, a second lens and a third lens. The three lenses are sequentially arranged from the object side to the image side along the optical axis, wherein an object-side surface of the third lens may be a convex surface.

In an exemplary implementation, the optical imaging lens assembly of the present disclosure may include four lenses having refractive power, which are a first lens, a second lens, a third lens and a fourth lens. The four lenses are sequentially arranged from the object side to the image side along the optical axis, wherein an object-side surface of the fourth lens may be a convex surface.

In an exemplary implementation, the optical imaging lens assembly of the present disclosure may include five lenses having refractive power, which are a first lens, a second lens, a third lens, a fourth lens and a fifth lens. The five lenses are sequentially arranged from the object side to the image side along the optical axis, wherein an object-side surface of the fifth lens may be a convex surface.

In an exemplary implementation, the optical imaging lens assembly of the present disclosure may include six lenses having refractive power, which are a first lens, a second lens, a third lens, a fourth lens, a fifth lens and a sixth lens. The six lenses are arranged sequentially from the object side to the image side along the optical axis, wherein an object-side surface of the sixth lens may be a convex surface.

In an exemplary implementation, the optical imaging lens assembly of the present disclosure may include seven lenses having refractive power, which are a first lens, a second lens, a third lens, a fourth lens, a fifth lens, a sixth lens and a seventh lens. The seven lenses are arranged sequentially from the object side to the image side along the optical axis, wherein an object-side surface of the seventh lens may be a convex lens.

In an exemplary implementation, the optical imaging lens assembly of the present disclosure may satisfy conditional expression $0.6<TTL/P*10<1.8$, wherein TTL is a distance along the optical axis from an object-side surface of the first lens to the image plane of the optical imaging lens assembly, and P is a distance along the optical axis from a to-be-captured object to the object-side surface of the first lens. More specifically, TTL and P may further satisfy $0.74 \leq TTL/P*10 \leq 1.51$. Controlling the ratio of TTL to P within an appropriate range is beneficial to enable the lens assembly to have a good resolution when the to-be-captured object is 20 mm~80 mm away from the lens assembly. When $TTL/P*10<0.6$, the optimal imaging distance of the lens assembly is relatively large, which result in the deterioration of the imaging quality within the actual recognition distance. When $TTL/P*10>1.8$, it means that the value of TTL is larger or the value of P is smaller. The larger the value of TTL is, the less it contributes to the miniaturization of the lens assembly, and the reduction of the value of P will cause the resolution to decrease. The range 20 mm$<$P$<$80 mm can satisfy the operating habits of most users.

In an exemplary implementation, the optical imaging lens assembly of the present disclosure may satisfy conditional expression $|RLS2/RLS1| \leq 2.0$, wherein RLS2 is a radius of curvature of an image-side surface of the lens closest to the image plane of the optical imaging lens assembly, and RLS1 is a radius of curvature of the object-side surface of the lens closest to the image plane of the optical imaging lens assembly. More specifically, RLS2 and RLS1 may further satisfy $0.04 \leq |RLS2/RLS1| \leq 1.99$. Appropriate control of the radii of curvature of the last lens is beneficial to improve the trend of light at the last lens and avoid excessive light deflection, thereby effectively reducing the sensitivity of the lens assembly, and effectively offsetting the astigmatic and coma of the optical system, improving imaging performance.

In an exemplary implementation, the optical imaging lens assembly of the present disclosure may satisfy conditional expression $f/EPD \leq 3.0$, wherein f is a total effective focal length of the optical imaging lens assembly and EPD is an entrance pupil diameter of the optical imaging lens assembly. More specifically, f and EPD may further satisfy $1.48 \leq f/EPD \leq 2.97$. Satisfying the conditional expression $f/EPD \leq 3.0$ is beneficial to obtain a large amount of incident light, ensure good imaging illuminance during the recognition process, and improve recognition accuracy. If the ratio of f to EPD is too large, there may be a situation where the energy of the imaging light is weak, resulting in a decrease in recognition accuracy.

In an exemplary implementation, the optical imaging lens assembly of the present disclosure may satisfy conditional expression $0.1<|f/f1|<1.3$, wherein f is a total effective focal length of the optical imaging lens assembly, and f1 is an effective focal length of the first lens. More specifically, f and f1 may further satisfy $0.13 \leq |f/f1| \leq 1.13$. Properly disposing the refractive power of the first lens, the deflection angle of the light at the first lens is slowed, and the sensitivity thereof is also reduced. At the same time, it is beneficial to avoid an excessively large inclination angle, thereby ensuring good manufacturability of the first lens.

In an exemplary implementation, the optical imaging lens assembly of the present disclosure may satisfy conditional expression $|f/R1| \leq 2.6$, wherein f is a total effective focal length of the optical imaging lens assembly, and R1 is a radius of curvature of the object-side surface of the first lens. More specifically, f and R1 may further satisfy $0.02 \leq |f/R1| \leq 2.34$. Appropriate control of the radius of curvature of the object-side surface of the first lens is beneficial to correct spherical aberration and reduce the sensitivity of field-of-view in the central area. When the ratio off to R1 is relatively large, the degree of convergence to the incident light caused by the object-side surface of the first lens decreases, resulting in degradation of imaging quality.

In an exemplary implementation, the optical imaging lens assembly of the present disclosure may satisfy conditional expression $0.3<DT12/DT11<1.6$, wherein DT12 is effective aperture radius of an image-side surface of the first lens, and DT11 is effective aperture radius of the object-side surface of the first lens. More specifically, DT12 and DT11 may further satisfy $0.33 \leq DT12/DT11 \leq 1.25$. In one aspect, by appropriate controlling the ratio between effective aperture radius of the object-side surface of the first lens and effective aperture radius of the image-side surface of the first lens, it is beneficial to reduce the size of the front end of the lens assembly, making the whole lens assembly thinner and lighter. On the other hand, it is beneficial to properly limit the range of incident light, eliminate edge light with poor quality, reduce the off-axis aberration and effectively improve the resolution of the lens assembly.

In an exemplary implementation, the optical imaging lens assembly of the present disclosure may satisfy formula $0.2<\Sigma CT/TTL<0.7$, wherein $\Sigma CT$ is sum of center thicknesses on the optical axis of the first lens and the at least one subsequent lens, and TTL is a distance along the optical axis from the object-side surface of the first lens to the image plane of the optical imaging lens assembly. More specifically, $\Sigma CT$ and TTL may further satisfy $0.43 \leq \Sigma CT/TTL \leq 0.58$. Appropriate control of the center thickness of each lens is beneficial to reduce the aberration of the lens assembly. At the same time, it is beneficial to ensure the manufacturability of the molding and assembling, to avoid the uncontrollable molding and easy deformation due to the lens being too thin or to avoid the problem that the stress and surface shape and etc. of the lens cannot be ensured after molding due to the lens being too thick, and to avoid various aging problems, which are prone to the lens assembly, when the stress is released after the lens assembly being assembled.

In an exemplary implementation, the optical imaging lens assembly of the present disclosure may satisfy formula 33°<HFOV<103°, wherein HFOV is half of a maximal field-of-view angle of the optical imaging lens assembly. More specifically, HFOV may further satisfy 35.8°≤HFOV≤102.1°. Appropriate control of the range of the field-of-view angle is beneficial to ensure that the entire lens recognition range can basically include the palmprint size of all people at a certain object distance. When HFOV<30°, the recognition range will be too small, and some people may not be able to be recognized during operation. When HFOV>103°, half of the field-of-view angle of the lens assembly has already reached ultra-wide angle, and when the field-of-view angle is further increased, the demands to the optical system increases, and the cost is greatly increased. However, in practice, such a large field-of-view angle is not needed, and this causing wasting.

In an exemplary implementation, the optical imaging lens assembly of the present disclosure may further include a stop to further improve the imaging quality. The stop may be disposed at any position between the object side and the image side.

Alternatively, the optical imaging lens assembly described above may further include an optical filter for correcting chromatic aberration and/or a protective glass for protecting a photosensitive element on the image plane.

The optical imaging lens assembly according to the above implementations of the present disclosure may employ a plurality of lenses, such as two or seven lenses described above. By properly disposing the refractive power, the surface shape, the center thickness of each lens, and spaced distances on the optical axis between the lenses, the size and the sensitivity of the optical imaging lens assembly can be effectively reduced, and the processability of the optical imaging lens assembly can be improved, such that the optical imaging lens assembly is more helpful for production processing and can be applied to portable electronic products. In addition, the optical imaging lens assembly configured as above also has large field-of-view angle, can be applied to palmprint recognition field, and maintain good imaging performance when a distance from the to-be-captured object to the object-side surface of the first lens is within a range from 20 mm to 80 mm.

In the implementations of the present disclosure, the surfaces of various lenses mostly are aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. By using an aspheric lens, the aberrations that occur during imaging can be eliminated as much as possible, and thus improving imaging quality.

However, it will be understood by those skilled in the art that the number of lenses constituting the optical imaging lens assembly can be varied to achieve the various results and advantages described in this specification without departing from the technical solution claimed by the present disclosure, such as two to seven lenses described below, but the present disclosure is not limited thereto. The imaging lens assembly can also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly according to an exemplary implementation includes, sequentially from an object side to an image side along an optical axis: a first lens E1, a stop STO, a second lens E2, an optical filter E3 and an image plane S7.

The first lens E1 has negative refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a convex surface. The optical filter E3 has an object-side surface S5 and an image-side surface S6. Light from the object sequentially passes through the respective surfaces S1 to S6 and is finally imaged on the image plane S7.

Table 1 shows surface type, radius of curvature, thickness, material and conic coefficient of each lens of the optical imaging lens assembly in embodiment 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | 20.0000 | | | |
| S1 | aspheric | −0.7596 | 0.8956 | 1.54 | 56.1 | −3.5108 |
| S2 | aspheric | −1.8631 | 0.4342 | | | 5.5467 |
| STO | spherical | infinite | −0.0085 | | | |
| S3 | aspheric | 0.5477 | 0.2272 | 1.64 | 23.5 | −3.6869 |
| S4 | aspheric | −0.9650 | 0.3651 | | | −22.2296 |
| S5 | spherical | infinite | 0.2100 | 1.52 | 64.2 | |
| S6 | spherical | infinite | 0.0682 | | | |
| S7 | spherical | infinite | | | | |

As can be seen from Table 1, the object-side surface S1 and the image-side surface S2 of the first lens E1 and the object-side surface S3 and the image-side surface S4 of the second lens E2 are aspheric. In this embodiment, the surface shape x of each aspheric lens can be defined by using, but not limited to, the following aspheric formula:

$$x = \frac{ch^2}{1+\sqrt{1-(k+1)c^2h^2}} + \sum A_i h^i \qquad (1)$$

Here, x is the sag—the axis-component of the displacement of the aspheric surface from the aspheric vertex, when the surface is at height h from the optical axis; c is the paraxial curvature of the aspheric surface, c=1/R (that is, the paraxial curvature c is reciprocal of the radius of curvature R in the above Table 1); k is the conic coefficient (given in the above Table 1); Ai is a correction coefficient for the i-th order of the aspheric surface. Table 2 below shows high-order coefficients $A_4, A_6, A_8, A_{10}, A_{12}, A_{14}, A_{16}, A_{18}$ and $A_{20}$ applicable to each aspheric surface S1-S4 in embodiment 1.

TABLE 2

| Surface number | A4 | A6 | A8 | A10 | A12 | A14 | A16 | A18 | A20 |
|---|---|---|---|---|---|---|---|---|---|
| S1 | 7.4497E−01 | −1.2990E+00 | 1.5620E+00 | −1.1998E+00 | 5.4915E−01 | −1.1617E−01 | 0.0000E+00 | 0.0000E+00 | 0.0000E+00 |
| S2 | 4.4004E+00 | −3.2641E+00 | 6.0072E+01 | −1.0272E+03 | 1.2218E+04 | −2.0684E+04 | 0.0000E+00 | 0.0000E+00 | 0.0000E+00 |
| S3 | 2.0273E+00 | 2.9497E+02 | −4.6285E+03 | −1.8928E+05 | −7.9391E+05 | 9.6812E+06 | −4.9938E+07 | 0.0000E+00 | 0.0000E+00 |
| S4 | 4.1399E+00 | 6.7409E+01 | −3.8585E+03 | 1.2885E+05 | −3.7817E+05 | 8.4012E+06 | −6.4516E+08 | −1.9225E+10 | −1.1208E+09 |

Table 3 shows effective focal lengths f1 to f2 of respective lens, a total effective focal length f, a distance TTL along the optical axis from the object-side surface S1 of the first lens E1 to the image plane S7, half of a maximal field-of-view angle HFOV, and a ratio f/EPD of the total effective focal length f to an entrance pupil diameter EPD of the optical imaging lens assembly in embodiment 1.

TABLE 3

| f1 (mm) | −3.30 | TTL (mm) | 2.19 |
|---|---|---|---|
| f2 (mm) | 0.58 | HFOV (°) | 50.5 |
| f (mm) | 0.42 | f/EPD | 2.97 |

The optical imaging lens assembly in embodiment 1 satisfies:

TTL/P*10=1.10, wherein TTL is the distance along the optical axis from the object-side surface S1 of the first lens E1 to the image plane S7, and P is a distance along the optical axis from a to-be-captured object to the object-side surface S1 of the first lens E1;

|RLS2/RLS1|=1.76, wherein RLS2 is a radius of curvature of the image-side surface of the lens closest to the image surface (in this embodiment, RLS2 is the radius of curvature of the image-side surface S4 of the second lens E2), and RLS1 is a radius of curvature of the object-side surface of the lens closest to the image surface (in this embodiment, RLS1 is the radius of curvature of the object-side surface S3 of the second lens E2);

|f/f1|=0.13, wherein f is the total effective focal length of the optical imaging lens assembly, and f1 is the effective focal length of the first lens E1;

|f/R1|=0.55, wherein f is the total effective focal length of the optical imaging lens assembly, and R1 is a radius of curvature of the object-side surface S1 of the first lens E1;

DT12/DT11=0.33, wherein DT12 is an effective aperture radius of the image-side surface S2 of the first lens E1, and DT11 is an effective aperture radius of the object-side surface S1 of the first lens E1; and ΣCT/TTL=0.51, wherein ΣCT is sum of center thicknesses along the optical axis of all lenses having refractive power, and TTL is the distance along the optical axis from the object-side surface S1 of the first lens E1 to the image plane S7.

Figures 2A, 2B:
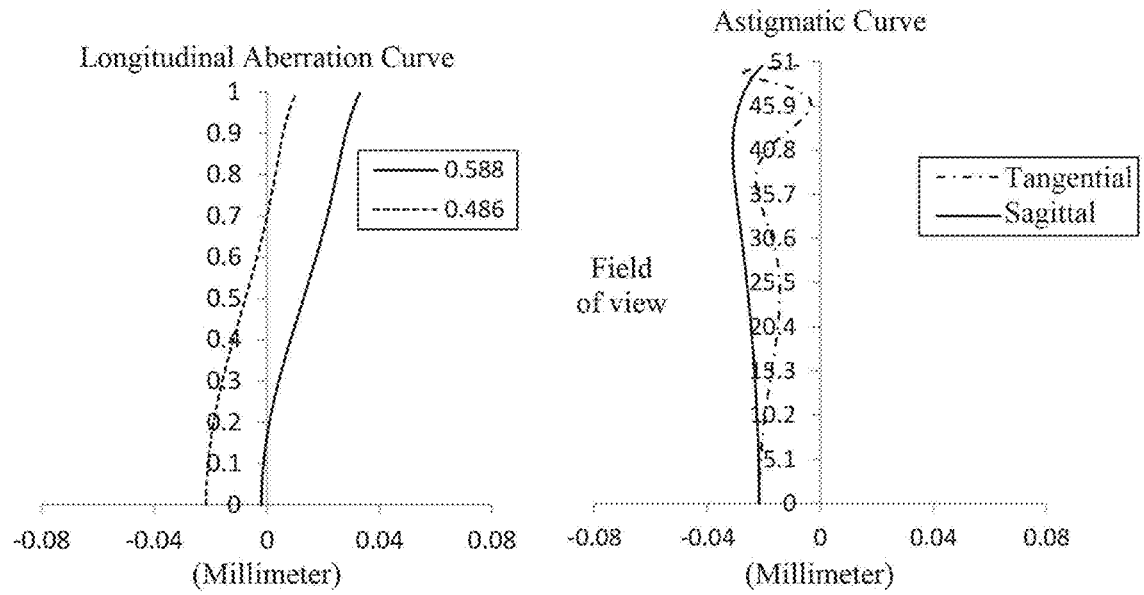
FIGS. 2A-2D illustrate a longitudinal aberration curve, an astigmatic curve, a distortion curve and a lateral color curve of the optical imaging lens assembly according to embodiment 1, respectively.
Figure 2C:
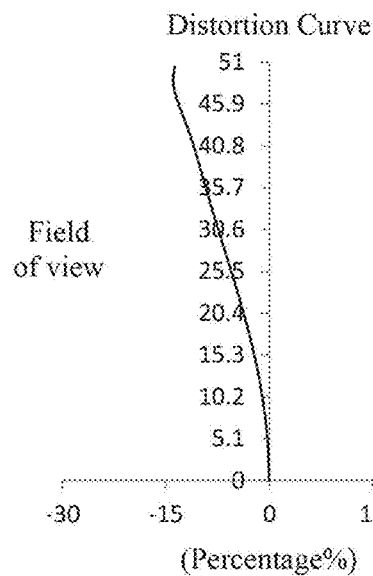
Figure 2D:
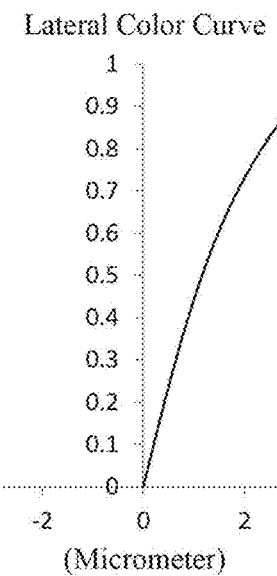

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatic curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion corresponding to different field-of-view angles. FIG. 2D illustrates a lateral color curve of the optical imaging lens assembly according to embodiment 1, representing deviations of different image heights on an image plane after light passes through the optical imaging lens assembly. It can be seen from FIG. 2A to FIG. 2D that the optical imaging lens assembly provided in embodiment 1 can achieve good image quality.

Embodiment 2

Figure 3:
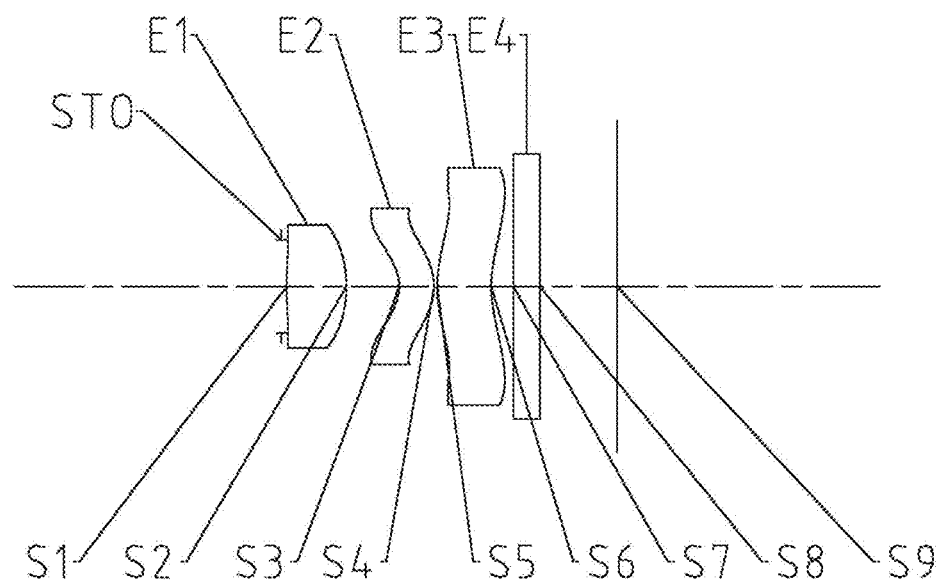
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly according to an exemplary implementation includes, sequentially from an object side to an image side along an optical axis: a stop STO, a first lens E1, a second lens E2, a third lens E3, an optical filter E4 and an image plane S9.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a convex surface. The third lens E3 has positive refractive power, an object-side surface S5 is convex surface, and an image-side surface S6 is a concave surface. The optical filter E4 has an object-side surface S7 and an image-side surface S8. Light from the object sequentially passes through the respective surfaces S1 to S8 and is finally imaged on the image plane S9.

Table 4 shows surface type, radius of curvature, thickness, material and conic coefficient of each lens of the optical imaging lens assembly in embodiment 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | spherical | infinite | 20.0000 | | | |
| STO | spherical | infinite | 0.0419 | | | |
| S1 | aspheric | 2.7814 | 0.4683 | 1.53 | 56.2 | −9.6162 |
| S2 | aspheric | −1.0045 | 0.4141 | | | −0.4918 |
| S3 | aspheric | −0.3330 | 0.2732 | 1.53 | 56.2 | −1.6105 |
| S4 | aspheric | −0.4333 | 0.0250 | | | −1.9109 |
| S5 | aspheric | 1.0344 | 0.4226 | 1.53 | 56.2 | −1.5523 |
| S6 | aspheric | 0.8958 | 0.1732 | | | −14.1974 |

TABLE 4-continued

| Surface number | Surface type | Radius of curvature | Thickness | Material Refractive index | Abbe number | Conic coefficient |
|---|---|---|---|---|---|---|
| S7 | spherical | infinite | 0.2100 | 1.52 | 64.2 | |
| S8 | spherical | infinite | 0.6036 | | | |
| S9 | spherical | infinite | | | | |

As can be seen from Table 4, in embodiment 2, the object-side surface S1 and the image-side surface S2 of the first lens E1, the object-side surface S3 and the image-side surface S4 of the second lens E2, and the object-side surface S5 and the image-side surface S6 of the third lens E3 are aspheric. Table 5 below shows high-order coefficients applicable to each aspheric surface in embodiment 2, wherein the surface type of each aspheric surface may be defined by the formula (1) given above in embodiment 1.

TABLE 5

| Surface number | A4 | A6 | A8 | A10 | A12 | A14 | A16 | A18 | A20 |
|---|---|---|---|---|---|---|---|---|---|
| S1 | −7.1027E−01 | 1.2951E+01 | −6.3229E+02 | 1.6294E+04 | −2.6024E+05 | 2.6012E+06 | −1.5832E+07 | 5.3580E+07 | −7.7206E+07 |
| S2 | −3.3848E−01 | −9.9169E+00 | 2.2951E+02 | −3.3329E+03 | 3.0839E+04 | −1.8013E+05 | 6.4121E+05 | −1.2678E+06 | 1.0655E+06 |
| S3 | 8.9619E−01 | 1.0037E+00 | −7.1473E+01 | 1.5051E+03 | −1.2562E+04 | 5.6598E+04 | −1.4701E+05 | 2.0856E+05 | −1.2581E+05 |
| S4 | 3.3991E−01 | −4.0292E−01 | −1.3187E+01 | 3.3612E+02 | −2.2619E+03 | 8.4035E+03 | −1.9277E+04 | 2.5642E+04 | −1.4989E+04 |
| S5 | −5.3931E−01 | −2.2527E+00 | 1.7855E+01 | −6.2349E+01 | 1.2026E+02 | −1.2508E+02 | 5.4181E+01 | 6.7114E−01 | −1.5826E+00 |
| S6 | 9.4181E−02 | −1.6104E+00 | 6.2520E+00 | −1.5999E+01 | 2.7370E+01 | −3.1576E+01 | 2.3686E+01 | −1.0551E+01 | 2.1351E+00 |

Table 6 shows effective focal lengths f1 to f3 of respective lens, a total effective focal length f, a distance TTL along the optical axis from the object-side surface S1 of the first lens E1 to the image plane S9, half of a maximal field-of-view angle HFOV, and a ratio f/EPD of the total effective focal length f to an entrance pupil diameter EPD of the optical imaging lens assembly in embodiment 2.

TABLE 6

| f1 (mm) | 1.47 | TTL (mm) | 2.59 |
|---|---|---|---|
| f2 (mm) | −44.44 | HFOV (°) | 35.8 |
| f3 (mm) | 254.97 | f/EPD | 2.25 |
| f (mm) | 1.65 | | |

Figure 4A:
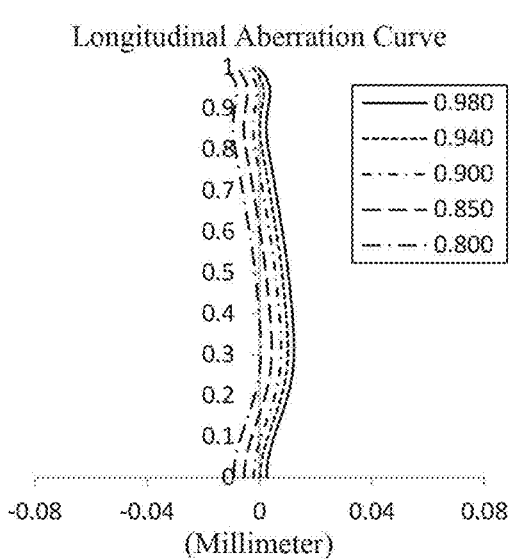
FIGS. 4A-4D illustrate a longitudinal aberration curve, an astigmatic curve, a distortion curve and a lateral color curve of the optical imaging lens assembly according to embodiment 2, respectively.
Figure 4B:
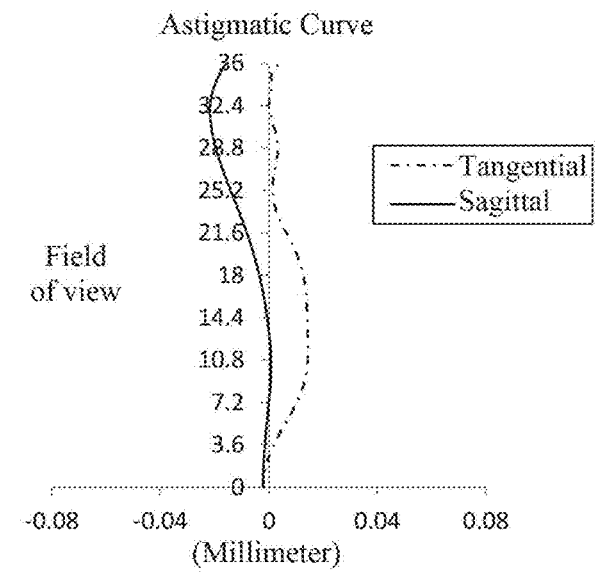
Figure 4C:
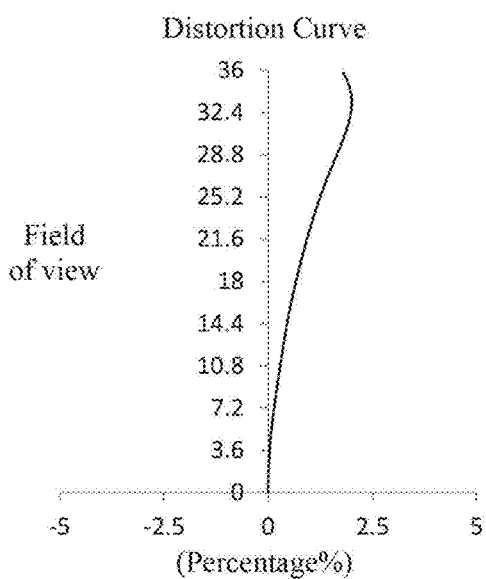
Figure 4D:
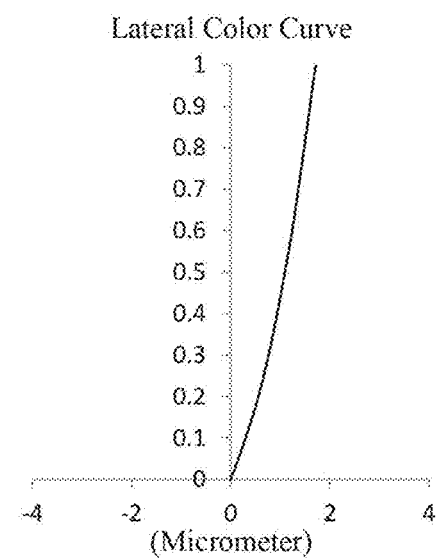

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatic curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion corresponding to different field-of-view angles. FIG. 4D illustrates a lateral color curve of the optical imaging lens assembly according to embodiment 2, representing deviations of different image heights on an image plane after light passes through the optical imaging lens assembly. It can be seen from FIG. 4A to FIG. 4D that the optical imaging lens assembly provided in embodiment 2 can achieve good image quality.

Embodiment 3

Figure 5:
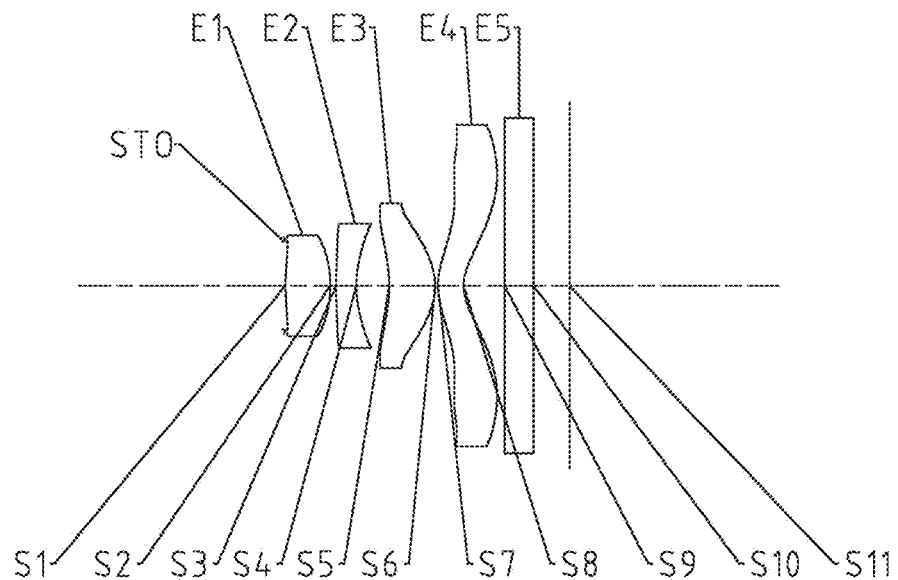
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly according to an exemplary implementation includes, sequentially from an object side to an image side along an optical axis: a stop STO, a first lens E1, a second lens E2, a third lens E3, a fourth lens E4, an optical filter E5 and an image plane S11.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 is concave surface, and an image-side surface S6 is a convex surface. The fourth lens E4 has negative refractive power, an object-side surface S7 thereof is a convex surface, and an image-side surface S8 thereof is a concave surface. The optical filter E5 has an object-side surface S9 and an image-side surface S10. Light from the object sequentially passes through the respective surfaces S1 to S10 and is finally imaged on the image plane S11.

Table 7 shows surface type, radius of curvature, thickness, material and conic coefficient of each lens of the optical imaging lens assembly in embodiment 3, wherein the units for the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | spherical | infinite | 40.0000 | | | |
| STO | spherical | infinite | 0.0101 | | | |
| S1 | aspheric | 2.5116 | 0.4622 | 1.55 | 56.1 | −14.8605 |
| S2 | aspheric | −1.4403 | 0.0606 | | | −3.1987 |
| S3 | aspheric | 2.9687 | 0.2100 | 1.64 | 23.3 | 14.5763 |
| S4 | aspheric | 1.1540 | 0.3399 | | | 1.0617 |
| S5 | aspheric | −1.3610 | 0.4753 | 1.55 | 56.1 | −0.7015 |
| S6 | aspheric | −0.6177 | 0.0300 | | | −5.3596 |
| S7 | aspheric | 0.7551 | 0.2649 | 1.55 | 56.1 | −3.1403 |
| S8 | aspheric | 0.4269 | 0.4246 | | | −3.3638 |
| S9 | spherical | infinite | 0.3000 | 1.52 | 64.2 | |
| S10 | spherical | infinite | 0.3736 | | | |
| S11 | spherical | infinite | | | | |

As can be seen from Table 7, in embodiment 3, the object-side surface S1 and the image-side surface S2 of the first lens E1, the object-side surface S3 and the image-side surface S4 of the second lens E2, the object-side surface S5 and the image-side surface S6 of the third lens E3, and the object-side surface S7 and the image-side surface S8 of the fourth lens E4 are aspheric. Table 8 below shows high-order coefficients applicable to each aspheric surface in embodiment 3, wherein the surface type of each aspheric surface may be defined by the formula (1) given above in embodiment 1.

side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 is convex sur-

TABLE 8

| Surface number | A4 | A6 | A8 | A10 | A12 | A14 | A16 | A18 | A20 |
|---|---|---|---|---|---|---|---|---|---|
| S1 | −2.2646E−01 | 2.0625E+00 | −1.1550E+02 | 2.4671E+03 | −3.1076E+04 | 2.3643E+05 | −1.0685E+06 | 2.6366E+06 | −2.7331E+06 |
| S2 | −8.4366E−01 | −5.2248E−01 | 6.6428E+01 | −9.6987E+02 | 7.6095E+03 | −3.5844E+04 | 1.0080E+05 | −1.5601E+05 | 1.0227E+05 |
| S3 | −1.0250E+00 | 2.1527E+00 | 1.2727E+01 | −1.9371E+02 | 1.2744E+03 | −4.8316E+03 | 1.0735E+04 | −1.2960E+04 | 6.5386E+03 |
| S4 | −5.4257E−01 | −2.5136E−01 | 1.0079E+01 | −7.7902E+01 | 3.6603E+02 | −1.0936E+03 | 1.9886E+03 | −1.9880E+03 | 8.2745E+02 |
| S5 | 8.6968E−01 | −4.8125E+00 | 2.6355E+01 | −1.0114E+02 | 2.5787E+02 | −4.0823E+02 | 3.7679E+02 | −1.8410E+02 | 3.8477E+01 |
| S6 | −1.0375E+00 | 4.6201E+00 | −1.9579E+01 | 6.2616E+01 | −1.2894E+02 | 1.5491E+02 | −8.2084E+01 | −8.4907E+00 | 1.8498E+01 |
| S7 | −6.0778E−01 | 7.7228E−01 | −6.9226E−01 | 2.2726E−01 | 2.6442E−01 | −3.4055E−01 | 1.6491E−01 | −3.8290E−02 | 3.5380E−03 |
| S8 | −2.8913E−01 | 1.9114E−01 | 2.6805E−02 | −2.5230E−01 | 2.8922E−01 | −1.7115E−01 | 5.7920E−02 | −1.0610E−02 | 8.1300E−04 |

Table 9 shows effective focal lengths f1 to f4 of respective lens, a total effective focal length f, a distance TTL along the optical axis from the object-side surface S1 of the first lens E1 to the image plane S11, half of a maximal field-of-view angle HFOV, and a ratio f/EPD of the total effective focal length f to an entrance pupil diameter EPD of the optical imaging lens assembly in embodiment 3.

TABLE 9

| f1 (mm) | 1.75 | f (mm) | 1.92 |
|---|---|---|---|
| f2 (mm) | −3.07 | TTL (mm) | 2.94 |
| f3 (mm) | 1.69 | HFOV (°) | 43.0 |
| f4 (mm) | −2.52 | f/EPD | 2.11 |

Figure 6A:
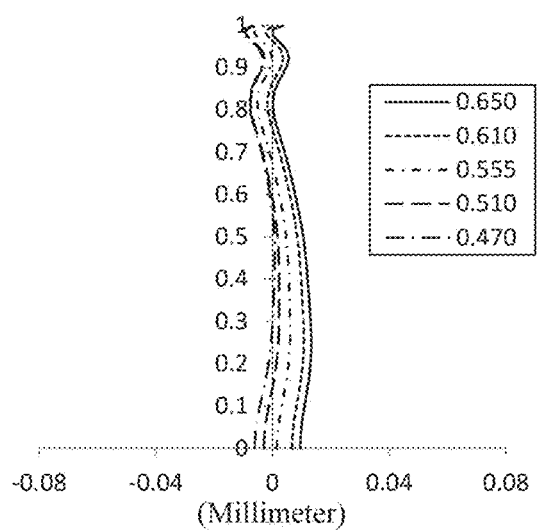
FIGS. 6A-6D illustrate a longitudinal aberration curve, an astigmatic curve, a distortion curve and a lateral color curve of the optical imaging lens assembly according to embodiment 3, respectively.
Figure 6B:
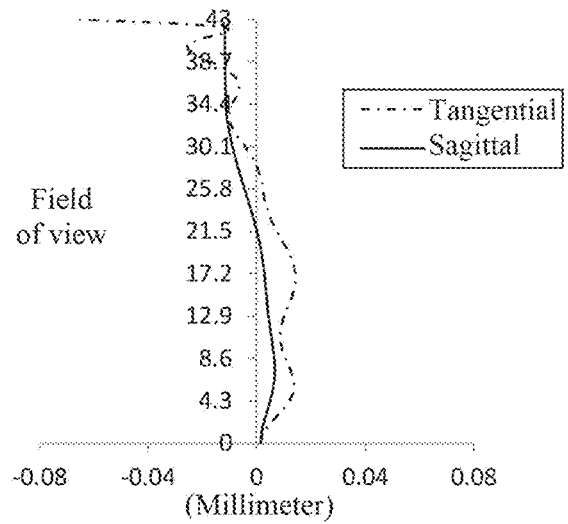
Figure 6C:
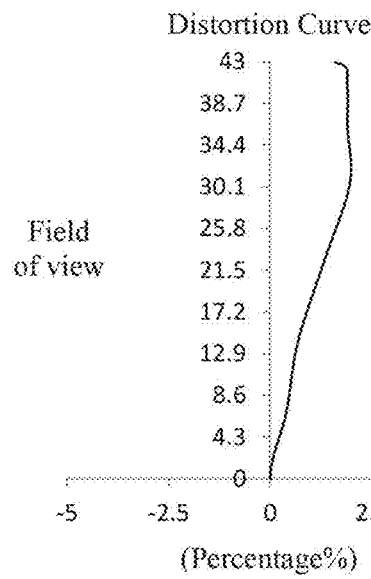
Figure 6D:
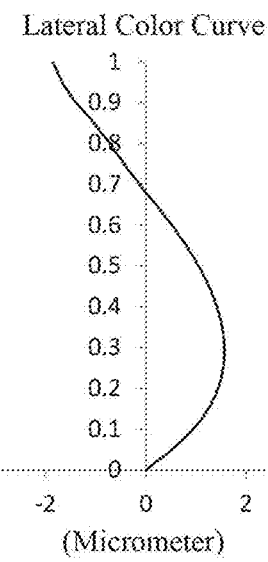

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatic curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion corresponding to different field-of-view angles. FIG. 6D illustrates a lateral color curve of the optical imaging lens assembly according to embodiment 3, representing deviations of different image heights on an image plane after light passes through the optical imaging lens assembly. It can be seen from FIG. 6A to FIG. 6D that the optical imaging lens assembly provided in embodiment 3 can achieve good image quality.

Embodiment 4

Figure 7:
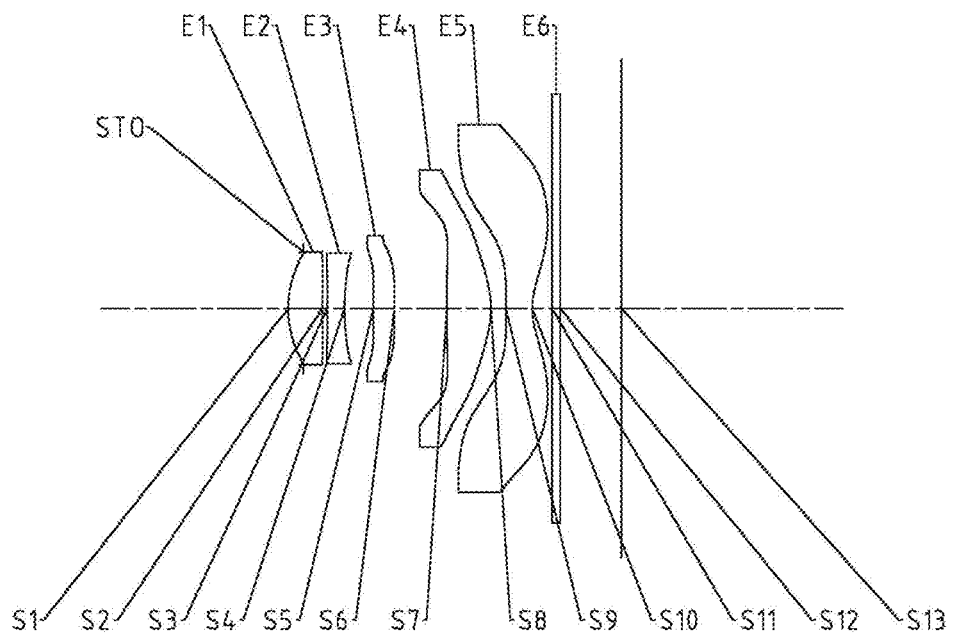
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly according to an exemplary implementation includes, sequentially from an object side to an image side along an optical axis: a stop STO, a first lens E1, a second lens E2, a third lens E3, a fourth lens E4, a fifth lens E5, an optical filter E6 and an image plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 is convex surface, and an image-side surface S6 is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from the object sequentially passes through the respective surfaces S1 to S12 and is finally imaged on the image plane S13.

Table 10 shows surface type, radius of curvature, thickness, material and conic coefficient of each lens of the optical imaging lens assembly in embodiment 4, wherein the units for the radius of curvature and the thickness are millimeter (mm).

TABLE 10

| | | | | Material | | |
|---|---|---|---|---|---|---|
| Surface number | Surface type | Radius of curvature | Thickness | Refractive index | Abbe number | Conic coefficient |
| OBJ | spherical | infinite | 30.0000 | | | |
| STO | spherical | infinite | −0.2053 | | | |
| S1 | aspheric | 1.4447 | 0.4636 | 1.55 | 56.1 | −0.8556 |
| S2 | aspheric | 10.8880 | 0.0664 | | | 34.1894 |
| S3 | aspheric | 15.2824 | 0.2350 | 1.67 | 20.4 | −99.0000 |
| S4 | aspheric | 3.2284 | 0.3907 | | | −0.7984 |
| S5 | aspheric | 8.7284 | 0.2869 | 1.55 | 56.1 | 9.8061 |
| S6 | aspheric | 1392.5190 | 0.7112 | | | 99.0000 |
| S7 | aspheric | 167.5996 | 0.5980 | 1.55 | 56.1 | 5.0000 |
| S8 | aspheric | −1.2736 | 0.2033 | | | −4.0038 |
| S9 | aspheric | 23.4317 | 0.3567 | 1.54 | 55.7 | 19.4632 |
| S10 | aspheric | 0.9143 | 0.2694 | | | −5.3118 |
| S11 | spherical | infinite | 0.1100 | 1.52 | 64.2 | |
| S12 | spherical | infinite | 0.8319 | | | |
| S13 | spherical | infinite | | | | |

As can be seen from Table 10, in embodiment 4, the object-side surface S1 and the image-side surface S2 of the first lens E1, the object-side surface S3 and the image-side surface S4 of the second lens E2, the object-side surface S5 and the image-side surface S6 of the third lens E3, the object-side surface S7 and the image-side surface S8 of the fourth lens E4, the object-side surface S9 and the image-side surface S10 of the fifth lens E5 are aspheric. Table 11 below shows high-order coefficients applicable to each aspheric surface in embodiment 4, wherein the surface type of each aspheric surface may be defined by the formula (1) given above in embodiment 1.

TABLE 11

| Surface number | A4 | A6 | A8 | A10 | A12 | A14 | A16 | A18 | A20 |
|---|---|---|---|---|---|---|---|---|---|
| S1 | 3.0337E−02 | 4.2725E−02 | −2.2959E−01 | 9.3198E−01 | −2.2958E+00 | 2.9197E+00 | −1.5859E+00 | 0.0000E+00 | 0.0000E+00 |
| S2 | −2.4624E−01 | 6.1399E−01 | −1.0816E+00 | 2.5501E+00 | −7.1447E+00 | 1.1333E+01 | −7.2897E+00 | 0.0000E+00 | 0.0000E+00 |
| S3 | −3.4135E−01 | 9.5404E−01 | −7.8263E−01 | −1.1263E+00 | 3.0317E+00 | −1.4156E+00 | −1.0437E+00 | 0.0000E+00 | 0.0000E+00 |
| S4 | −1.8077E−01 | 6.0775E−01 | −5.7555E−01 | 6.2009E−02 | −2.3464E−01 | 2.4399E+00 | −2.4462E+00 | 0.0000E+00 | 0.0000E+00 |
| S5 | −2.8064E−01 | −4.0027E−01 | 4.1307E+00 | −2.3984E+01 | 8.2969E+01 | −1.7517E+02 | 2.1986E+02 | −1.4797E+02 | 4.0771E+01 |
| S6 | −2.2012E−01 | −1.9774E−01 | 9.5406E−01 | −3.0726E+00 | 5.5005E+00 | −4.3555E+00 | −8.1152E−01 | 3.7774E+00 | −1.7271E+00 |
| S7 | 7.3322E−02 | −1.9664E−01 | 4.1889E−01 | −6.5915E−01 | 5.9724E−01 | −3.3418E−01 | 1.1439E−01 | −2.1540E−02 | 1.6800E−03 |
| S8 | 1.9098E−01 | −4.3602E−01 | 7.2989E−01 | −7.5389E−01 | 4.5310E−01 | −1.5998E−01 | 3.2675E−02 | −3.5500E−03 | 1.5700E−04 |
| S9 | −3.2722E−01 | 1.4374E−01 | 1.1861E−02 | −5.6170E−02 | 4.0082E−02 | −1.5070E−02 | 3.1860E−03 | −3.6000E−04 | 1.6500E−05 |
| S10 | −2.0783E−01 | 1.5899E−01 | −9.3410E−02 | 3.8378E−02 | −1.0450E−02 | 1.7930E−03 | −1.8000E−04 | 1.0000E−05 | −2.2000E−07 |

Table 12 shows effective focal lengths f1 to f5 of respective lens, a total effective focal length f, a distance TTL along the optical axis from the object-side surface S1 of the first lens E1 to the image plane S13, half of a maximal field-of-view angle HFOV, and a ratio f/EPD of the total effective focal length f to an entrance pupil diameter EPD of the optical imaging lens assembly in embodiment 4.

TABLE 12

| f1 (mm) | 3.00 | f (mm) | 3.30 |
|---|---|---|---|
| f2 (mm) | −6.20 | TTL (mm) | 4.52 |
| f3 (mm) | 16.09 | HFOV (°) | 40.2 |
| f4 (mm) | 2.32 | f/EPD | 2.16 |
| f5 (mm) | −1.78 | | |

Figure 8A:
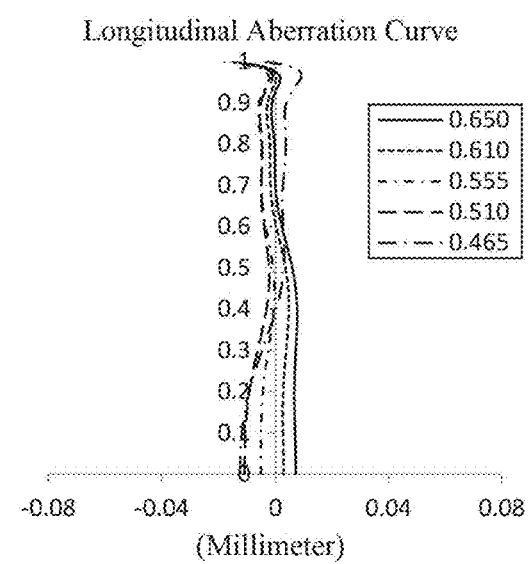
FIGS. 8A-8D illustrate a longitudinal aberration curve, an astigmatic curve, a distortion curve and a lateral color curve of the optical imaging lens assembly according to embodiment 4, respectively.
Figure 8B:
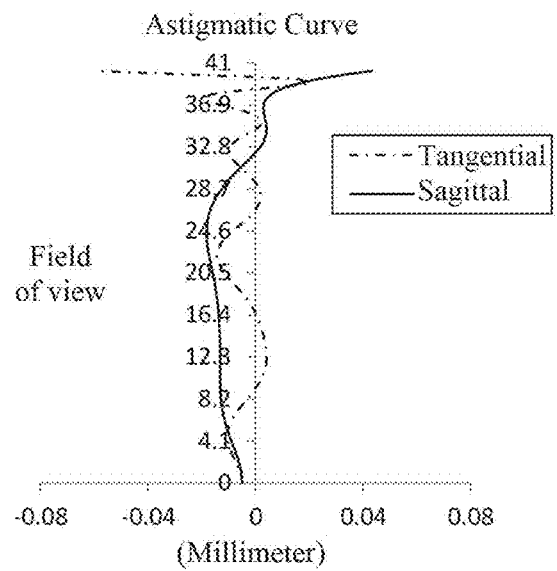
Figure 8C:
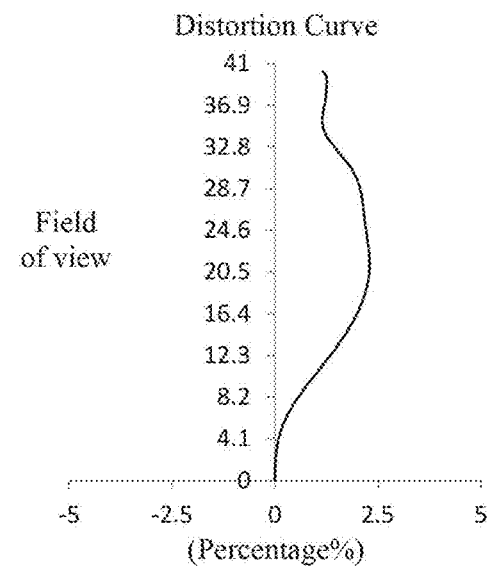
Figure 8D:
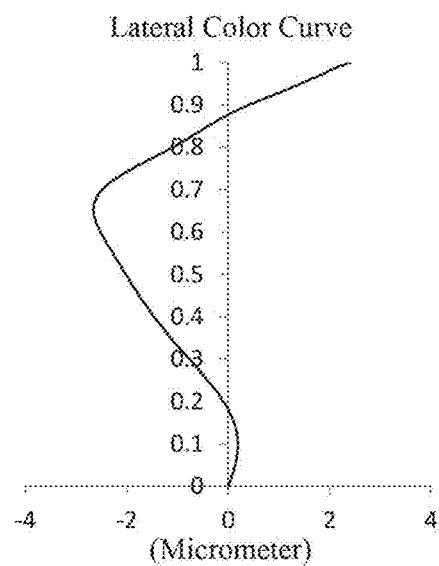

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatic curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion corresponding to different field-of-view angles. FIG. 8D illustrates a lateral color curve of the optical imaging lens assembly according to embodiment 4, representing deviations of different image heights on an image plane after light passes through the optical imaging lens assembly. It can be seen from FIG. 8A to FIG. 8D that the optical imaging lens assembly provided in embodiment 4 can achieve good image quality.

Embodiment 5

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly according to an exemplary implementation includes, sequentially from an object side to an image side along an optical axis: a first lens E1, a second lens E2, a stop STO, a third lens E3, a fourth lens E4, a fifth lens E5, a sixth lens E6, an optical filter E7 and an image plane S15.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 is convex surface, and an image-side surface S6 is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 13 shows surface type, radius of curvature, thickness, material and conic coefficient of each lens of the optical imaging lens assembly in embodiment 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | spherical | infinite | 50.0000 | | | |
| S1 | aspheric | 81.5301 | 0.2862 | 1.55 | 56.1 | 0.0000 |
| S2 | aspheric | 1.6380 | 0.7849 | | | −0.3795 |
| S3 | aspheric | 1.5920 | 0.3209 | 1.62 | 25.9 | 0.2138 |
| S4 | aspheric | 2.2215 | 0.4931 | | | 6.6372 |
| STO | spherical | infinite | 0.0580 | | | |
| S5 | aspheric | 3.9826 | 0.6253 | 1.55 | 56.1 | 9.3748 |
| S6 | aspheric | −1.6795 | 0.3671 | | | 1.6145 |
| S7 | aspheric | −3.4217 | 0.2350 | 1.68 | 19.2 | 5.1264 |
| S8 | aspheric | 8.6031 | 0.0698 | | | 0.0000 |
| S9 | aspheric | 6.9368 | 0.8699 | 1.55 | 56.1 | −71.1483 |
| S10 | aspheric | −2.0088 | 0.3551 | | | 0.3090 |
| S11 | aspheric | 0.8530 | 0.3723 | 1.64 | 24.0 | −3.3479 |
| S12 | aspheric | 0.7265 | 0.4135 | | | −2.3649 |
| S13 | spherical | infinite | 0.1100 | 1.52 | 64.2 | |
| S14 | spherical | infinite | 0.5789 | | | |
| S15 | spherical | infinite | | | | |

As can be seen from Table 13, in embodiment 5, the object-side surface S1 and the image-side surface S2 of the first lens E1, the object-side surface S3 and the image-side surface S4 of the second lens E2, the object-side surface S5 and the image-side surface S6 of the third lens E3, the object-side surface S7 and the image-side surface S8 of the fourth lens E4, the object-side surface S9, the image-side surface S10 of the fifth lens E5, and the object-side surface S11 and the image-side surface S12 of the sixth lens E6 are aspheric. Table 14 below shows high-order coefficients applicable to each aspheric surface in embodiment 5, wherein the surface type of each aspheric surface may be defined by the formula (1) given above in embodiment 1.

a fourth lens E4, a fifth lens E5, a sixth lens E6, a seventh lens E7, an optical filter E8 and an image plane S17.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 is convex surface, and an image-side surface S6 is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from the object sequentially passes through the respective surfaces S1 to S16 and is finally imaged on the image plane S17.

TABLE 14

| Surface number | A4 | A6 | A8 | A10 | A12 | A14 | A16 | A18 |
|---|---|---|---|---|---|---|---|---|
| S1 | 1.2738E−01 | −9.9850E−02 | 5.7686E−02 | −2.3160E−02 | 6.3610E−03 | −1.1300E−03 | 1.1700E−04 | −5.4000E−06 |
| S2 | 1.2178E−01 | −8.3870E−02 | −1.0630E−02 | 3.4734E−02 | −1.5990E−02 | 2.2810E−03 | 0.0000E+00 | 0.0000E+00 |
| S3 | −1.0620E−02 | 5.3780E−02 | −1.2373E−01 | 2.1404E−01 | −1.1629E−01 | 0.0000E+00 | 0.0000E+00 | 0.0000E+00 |
| S4 | 6.1092E−02 | 2.7128E−02 | 1.2973E−01 | −8.0310E−02 | 1.8707E−01 | 0.0000E+00 | 0.0000E+00 | 0.0000E+00 |
| S5 | −1.4780E−02 | −2.1700E−02 | −1.2500E−03 | −7.1030E−02 | 0.0000E+00 | 0.0000E+00 | 0.0000E+00 | 0.0000E+00 |
| S6 | −3.4510E−02 | 5.5060E−03 | 7.9167E−02 | −4.0056E−01 | 5.0998E−01 | 4.1476E−01 | −1.3778E+00 | 7.8425E−01 |
| S7 | −1.1862E−01 | −3.7257E−01 | 2.1056E+00 | −5.6047E+00 | 8.6436E+00 | −8.0673E+00 | 4.2118E+00 | −9.2737E−01 |
| S8 | −4.2910E−01 | −5.7628E−01 | 1.9112E+00 | −3.2057E+00 | 3.2700E+00 | −2.0232E+00 | 6.9719E−01 | −1.0254E−01 |
| S9 | 6.1764E−02 | −5.3620E−01 | 1.1296E+00 | −1.4308E+00 | 1.1828E+00 | −6.0509E−01 | 1.7240E−01 | −2.0980E−02 |
| S10 | −3.1710E−01 | 7.9555E−01 | −1.3322E+00 | 1.4883E+00 | −1.0790E+00 | 4.8551E−01 | −1.2047E−01 | 1.2392E−02 |
| S11 | −1.7773E−01 | −9.1000E−04 | 1.8697E−02 | 9.2200E−04 | −5.1600E−03 | 2.1110E−03 | −3.6000E−04 | 2.2600E−05 |
| S12 | −2.1017E−01 | 9.9381E−02 | −3.2590E−02 | 6.6250E−03 | −7.4000E−04 | 3.0700E−05 | 1.4900E−06 | −1.4000E−07 |

Table 15 shows effective focal lengths f1 to f6 of respective lens, a total effective focal length f, a distance TTL along the optical axis from the object-side surface S1 of the first lens E1 to the image plane S15, half of a maximal field-of-view angle HFOV, and a ratio f/EPD of the total effective focal length f to an entrance pupil diameter EPD of the optical imaging lens assembly in embodiment 5.

TABLE 15

| f1 (mm) | −3.06 | f6 (mm) | 50.76 |
|---|---|---|---|
| f2 (mm) | 7.57 | f (mm) | 1.70 |
| f3 (mm) | 2.25 | TTL (mm) | 5.94 |
| f4 (mm) | −3.57 | HFOV (°) | 60.2 |
| f5 (mm) | 2.95 | f/EPD | 1.94 |

Figure 10C:
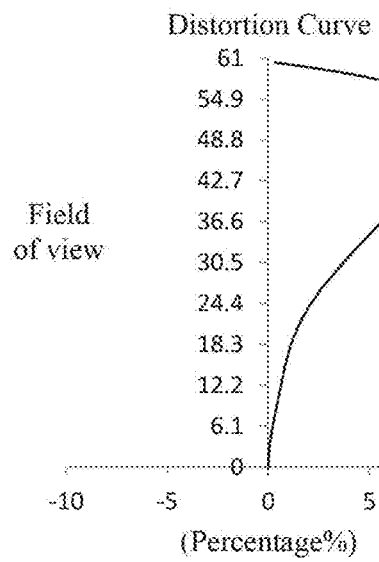
Figure 10D:
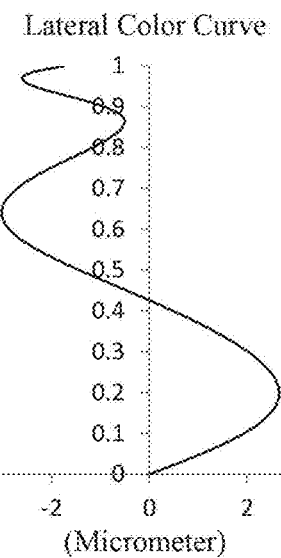

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatic curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion corresponding to different field-of-view angles. FIG. 10D illustrates a lateral color curve of the optical imaging lens assembly according to embodiment 5, representing deviations of different image heights on an image plane after light passes through the optical imaging lens assembly. It can be seen from FIG. 10A to FIG. 10D that the optical imaging lens assembly provided in embodiment 5 can achieve good image quality.

Embodiment 6

Figure 11:
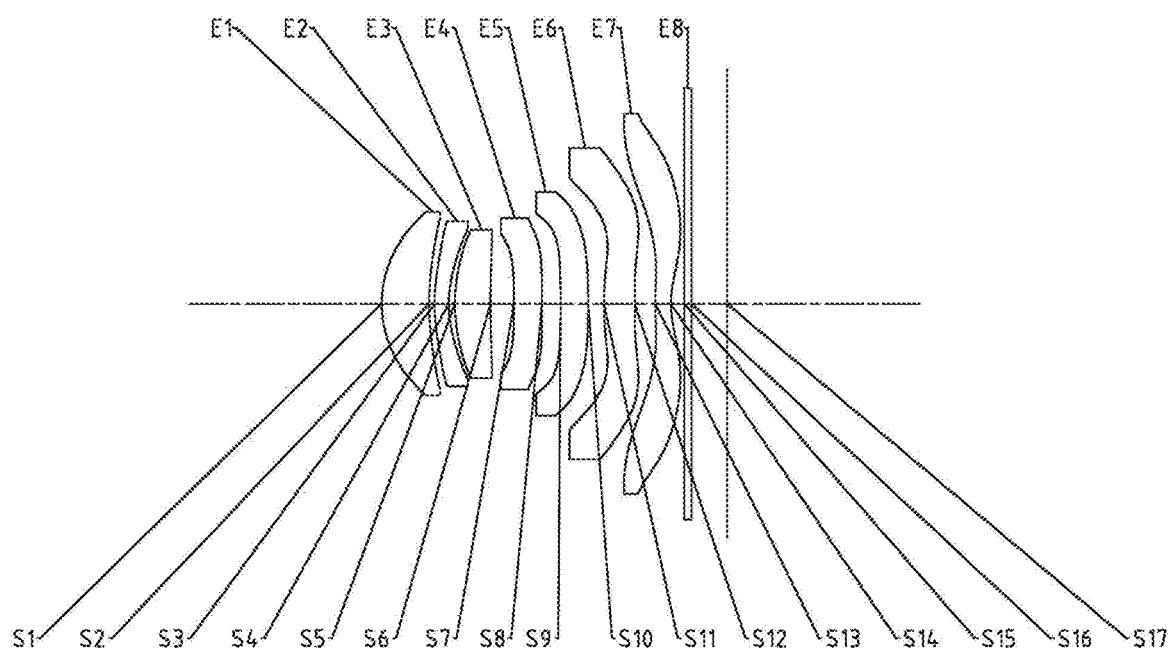
FIG. 11 is a schematic structural view of an optical imaging lens assembly according to embodiment 6 of the present disclosure.

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly according to an exemplary implementation includes, sequentially from an object side to an image side along an optical axis: a first lens E1, a second lens E2, a third lens E3, Table 16 shows surface type, radius of curvature, thickness, material and conic coefficient of each lens of the optical imaging lens assembly in embodiment 6, wherein the units for the radius of curvature and the thickness are millimeter (mm).

TABLE 16

| | | | | Material | | |
|---|---|---|---|---|---|---|
| Surface number | Surface type | Radius of curvature | Thickness | Refractive index | Abbe number | Conic coefficient |
| OBJ | spherical | infinite | 60.0000 | | | |
| S1 | aspheric | 1.7626 | 0.7368 | 1.55 | 56.1 | −0.2584 |
| S2 | aspheric | 4.8563 | 0.0827 | | | −0.8037 |
| S3 | aspheric | 2.8430 | 0.2200 | 1.67 | 20.4 | −18.6301 |
| S4 | aspheric | 1.7862 | 0.0965 | | | −4.4023 |
| S5 | aspheric | 2.6377 | 0.5508 | 1.55 | 56.1 | −0.4658 |
| S6 (STO) | aspheric | 12.8713 | 0.3656 | | | 0.0000 |
| S7 | aspheric | −17.3618 | 0.4354 | 1.67 | 20.4 | 97.3264 |
| S8 | aspheric | −3250.9600 | 0.2889 | | | 99.0000 |
| S9 | aspheric | −21.4276 | 0.4296 | 1.66 | 21.5 | 99.0000 |
| S10 | aspheric | −14.2156 | 0.2423 | | | 49.5587 |
| S11 | aspheric | 4.5932 | 0.4780 | 1.55 | 56.1 | −0.1782 |
| S12 | aspheric | −887.4590 | 0.3198 | | | 99.0000 |

TABLE 16-continued

| Surface number | Surface type | Radius of curvature | Thickness | Material Refractive index | Abbe number | Conic coefficient |
|---|---|---|---|---|---|---|
| S13 | aspheric | 5.1215 | 0.2422 | 1.55 | 56.1 | −0.4644 |
| S14 | aspheric | 1.4103 | 0.2074 | | | −7.2797 |
| S15 | spherical | infinite | 0.1100 | 1.52 | 64.2 | |
| S16 | spherical | infinite | 0.5539 | | | |
| S17 | spherical | infinite | | | | |

As can be seen from Table 16, in embodiment 6, the object-side surface S1 and the image-side surface S2 of the first lens E1, the object-side surface S3 and the image-side surface S4 of the second lens E2, the object-side surface S5 and the image-side surface S6 of the third lens E3, the object-side surface S7 and the image-side surface S8 of the fourth lens E4, the object-side surface S9 and the image-side surface S10 of the fifth lens E5, the object-side surface S11 and the image-side surface S12 of the sixth lens E6, and the object-side surface S13 and the image-side surface S14 of the seventh lens E7 are aspheric. Table 17 below shows high-order coefficients applicable to each aspheric surface in embodiment 6, wherein the surface type of each aspheric surface may be defined by the formula (1) given above in embodiment 1.

TABLE 17

| Surface number | A4 | A6 | A8 | A10 | A12 | A14 | A16 | A18 | A20 |
|---|---|---|---|---|---|---|---|---|---|
| S1 | 6.1370E−03 | 8.8200E−04 | −1.0320E−02 | 3.3015E−02 | −5.2850E−02 | 4.7017E−02 | −2.3800E−02 | 6.2540E−03 | −6.5000E−04 |
| S2 | 1.3720E−03 | 1.6971E−02 | −6.7070E−02 | 8.2240E−02 | −4.0730E−02 | 2.7736E−02 | −1.2590E−02 | 3.1229E−03 | 1.9760E−03 |
| S3 | 1.4938E−02 | −8.4900E−03 | −1.0008E−01 | 2.5863E−01 | −3.3537E−01 | 2.6256E−01 | −1.2189E−01 | 3.1229E−02 | −3.5000E−03 |
| S4 | −2.5400E−02 | 8.9437E−02 | −2.5620E−01 | 4.1630E−01 | −3.4382E−01 | 4.2061E−02 | 1.6498E−01 | −1.1960E−01 | 2.5287E−02 |
| S5 | −1.9940E−02 | 1.3312E−02 | 5.9658E−02 | −4.0631E−01 | 1.0240E+00 | −1.4192E+00 | 1.1342E+00 | −4.8087E−01 | 8.3529E−02 |
| S6 | −5.4000E−04 | −1.0265E−01 | 3.3620E−01 | −6.1308E−01 | 5.3985E−01 | −4.6010E−02 | −3.2351E−01 | 2.5544E−01 | −6.2740E−02 |
| S7 | −7.2490E−02 | −8.4470E−02 | 1.7063E−01 | −1.9014E−01 | −2.6751E−01 | 1.0580E+00 | −1.3211E+00 | 7.6986E−01 | −1.7721E−01 |
| S8 | −5.8050E−02 | −2.2800E−02 | −1.2860E−02 | 5.9522E−02 | −1.0887E−01 | 1.1644E−01 | −6.7650E−02 | 1.9691E−02 | −2.1100E−03 |
| S9 | −1.5230E−02 | −4.9460E−02 | 1.4900E−01 | −4.0400E−01 | 6.1634E−01 | −5.8584E−01 | 3.3905E−01 | −1.0828E−01 | 1.4493E−02 |
| S10 | −3.6870E−02 | −7.5400E−03 | −3.2700E−03 | 5.0340E−02 | −7.9460E−02 | 5.7640E−02 | −2.2050E−02 | 4.3000E−03 | −3.4000E−04 |
| S11 | 2.4870E−02 | −1.3914E−01 | 5.6689E−02 | 2.4263E−02 | −4.2010E−02 | 2.3293E−02 | −6.6700E−03 | 9.8000E−04 | −5.8000E−05 |
| S12 | 2.0126E−01 | −2.6504E−01 | 1.7474E−01 | −7.6620E−02 | 2.2642E−02 | −4.4300E−03 | 5.5300E−04 | −4.0000E−05 | 1.3100E−06 |
| S13 | −2.3925E−01 | 1.5698E−01 | −6.5820E−02 | 1.7989E−02 | −3.1700E−03 | 3.5300E−04 | −2.4000E−05 | 9.0100E−07 | −1.4000E−08 |
| S14 | −1.5299E−01 | 9.4989E−02 | −4.4040E−02 | 1.4609E−02 | −3.3100E−03 | 4.9200E−04 | −4.6000E−05 | 2.4200E−06 | −5.5000E−08 |

Table 18 shows effective focal lengths f1 to f7 of respective lens, a total effective focal length f, a distance TTL along the optical axis from the object-side surface S1 of the first lens E1 to the image plane S17, half of a maximal field-of-view angle HFOV, and a ratio f/EPD of the total effective focal length f to an entrance pupil diameter EPD of the optical imaging lens assembly in embodiment 6.

TABLE 18

| f1 (mm) | 4.67 | f7 (mm) | −3.65 |
|---|---|---|---|
| f2 (mm) | −7.85 | f (mm) | 4.13 |
| f3 (mm) | 5.96 | TTL (mm) | 5.36 |
| f4 (mm) | −26.15 | HFOV (°) | 36.8 |
| f5 (mm) | 62.70 | f/EPD | 1.48 |
| f6 (mm) | 8.36 | | |

Figures 12A, 12B:
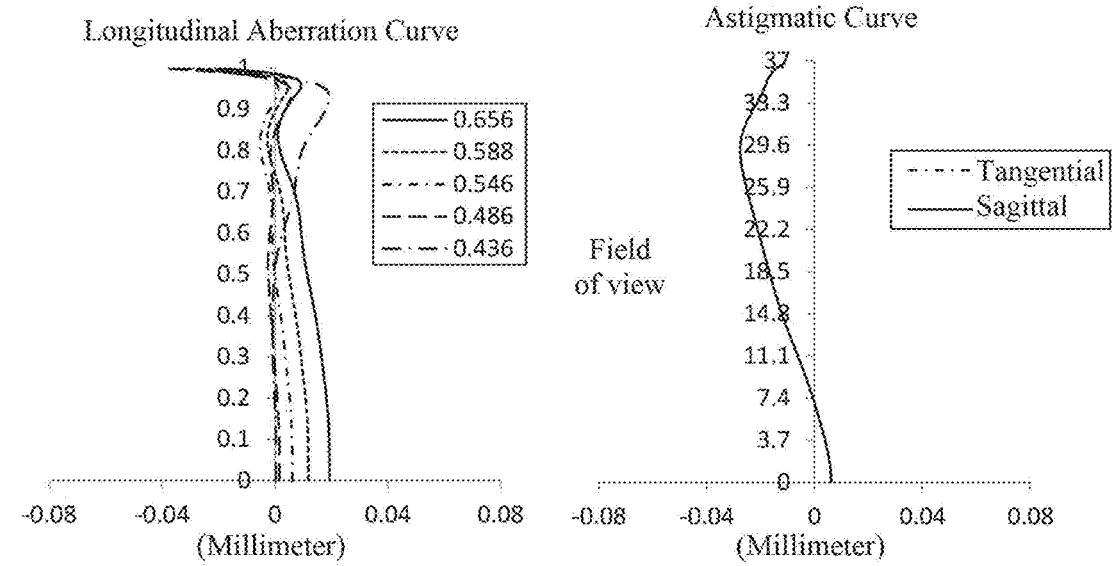
FIGS. 12A-12D illustrate a longitudinal aberration curve, an astigmatic curve, a distortion curve and a lateral color curve of the optical imaging lens assembly according to embodiment 6, respectively.
Figures 12C, 12D:
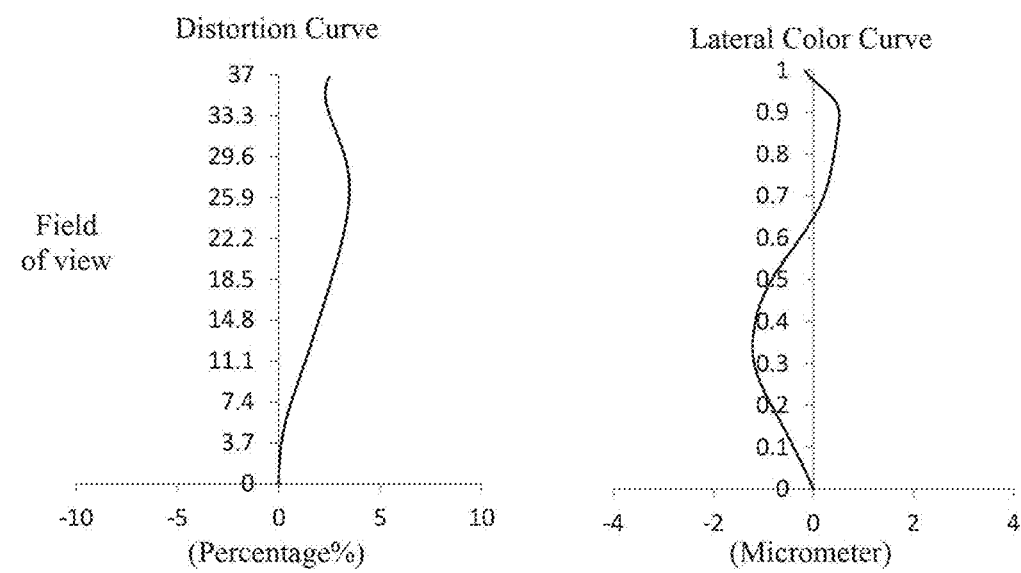

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatic curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion corresponding to different field-of-view angles. FIG. 12D illustrates a lateral color curve of the optical imaging lens assembly according to embodiment 6, representing deviations of different image heights on an image plane after light passes through the optical imaging lens assembly. It can be seen from FIG. 12A to FIG. 12D that the optical imaging lens assembly provided in embodiment 6 can achieve good image quality.

Embodiment 7

Figure 13:
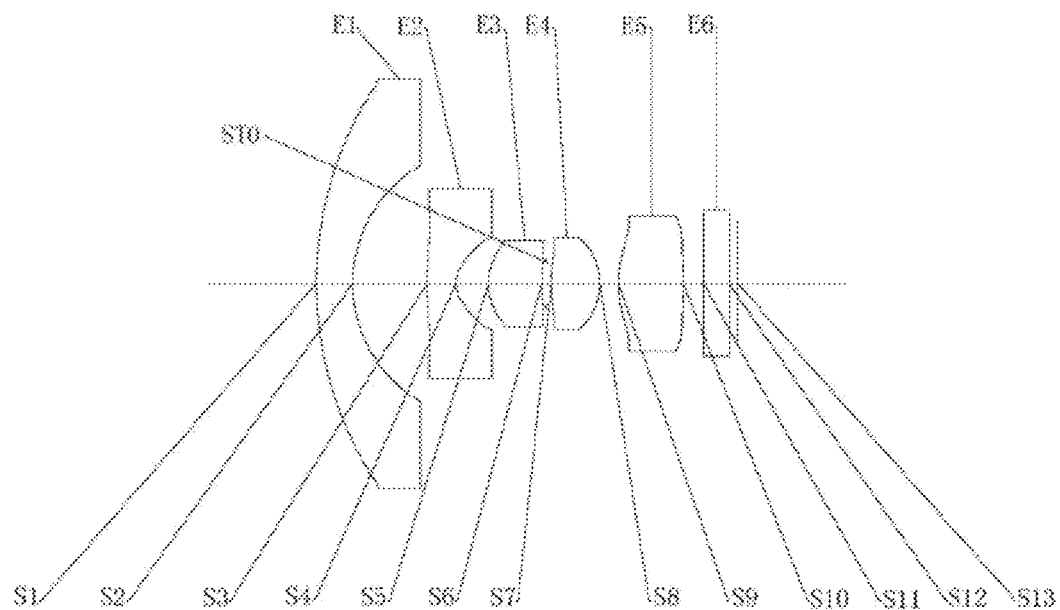
FIG. 13 is a schematic structural view of an optical imaging lens assembly according to embodiment 7 of the present disclosure.

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly according to an exemplary implementation includes, sequentially from an object side to an image side along an optical axis: a first lens E1, a second lens E2, a third lens E3, a stop STO, a fourth lens E4, a fifth lens E5, an optical filter E6 and an image plane S13.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 is convex surface, and an image-side surface S6 is a concave surface. The fourth lens E4 has positive refractive power, an object-side surface S7 thereof is a convex surface, and an image-side surface S8 thereof is a convex surface. The fifth lens E5 has positive refractive power, an object-side surface S9 thereof is a convex surface, and an image-side surface S10 thereof is a convex surface. The optical filter E6 has an object-side surface S11 and an image-side surface S12. Light from the object sequentially passes through the respective surfaces S1 to S12 and is finally imaged on the image plane S13.

Table 19 shows surface type, radius of curvature, thickness, material and conic coefficient of each lens of the optical imaging lens assembly in embodiment 7, wherein the units for the radius of curvature and the thickness are millimeter (mm).

TABLE 19

| Surface number | Surface type | Radius of curvature | Thickness | Refractive index | Abbe number | Conic coefficient |
|---|---|---|---|---|---|---|
| OBJ | spherical | infinite | 80.0000 | | | |
| S1 | spherical | 10.0000 | 1.0000 | 1.84 | 42.9 | 0.0000 |
| S2 | spherical | 3.7780 | 2.0410 | | | 0.0000 |
| S3 | aspheric | 6.0310 | 0.8000 | 1.56 | 36.7 | 0.8453 |
| S4 | aspheric | 0.7480 | 0.9010 | | | −0.7017 |
| S5 | aspheric | 1.5860 | 1.4650 | 1.58 | 30.8 | 0.4869 |
| S6 | aspheric | 4.6340 | 0.1130 | | | −18.6436 |
| STO | spherical | infinite | 0.1500 | | | |
| S7 | spherical | 5.4040 | 1.3400 | 1.49 | 70.4 | 0.0000 |
| S8 | spherical | −1.6920 | 0.5120 | | | 0.0000 |
| S9 | aspheric | 3.1380 | 1.7850 | 1.53 | 56.7 | −0.5165 |
| S10 | aspheric | −6.2550 | 0.5600 | | | 6.3114 |
| S11 | spherical | infinite | 0.7000 | 1.52 | 64.2 | |
| S12 | spherical | infinite | 0.2382 | | | |
| S13 | spherical | infinite | | | | |

As can be seen from Table 19, in embodiment 7, the object-side surface S1 and the image-side surface S2 of the first lens E1 and the object-side surface S7 and the image-side surface S8 of the fourth lens E4 are spherical. The object-side surface S3 and the image-side surface S4 of the second lens E2, the object-side surface S5 and the image-side surface S6 of the third lens E3, and the object-side surface S9 and the image-side surface S10 of the fifth lens E5 are aspheric. Table 20 below shows high-order coefficients applicable to each aspheric surface in embodiment 7, wherein the surface type of each aspheric surface may be defined by the formula (1) given above in embodiment 1.

TABLE 20

| Surface number | A4 | A6 | A8 |
|---|---|---|---|
| S3 | −3.1710E−02 | 4.3250E−03 | −2.1000E−04 |
| S4 | −1.5387E−01 | −5.5340E−02 | 4.5030E−03 |
| S5 | −2.9160E−02 | −4.7500E−02 | 1.0628E−02 |
| S6 | 1.1292E−01 | −1.1832E−01 | 1.9508E−01 |
| S9 | −3.4600E−03 | −4.8300E−03 | −7.3000E−04 |
| S10 | 8.6128E−02 | −3.4310E−02 | 3.5980E−03 |

Table 21 shows effective focal lengths f1 to f5 of respective lens, a total effective focal length f, a distance TTL along the optical axis from the object-side surface S1 of the first lens E1 to the image plane S13, half of a maximal field-of-view angle HFOV, and a ratio f/EPD of the total effective focal length f to an entrance pupil diameter EPD of the optical imaging lens assembly in embodiment 7.

TABLE 21

| f1 (mm) | −7.80 | f (mm) | 1.00 |
|---|---|---|---|
| f2 (mm) | −1.61 | TTL (mm) | 11.61 |
| f3 (mm) | 3.48 | HFOV (°) | 102.1 |
| f4 (mm) | 2.81 | f/EPD | 1.96 |
| f5 (mm) | 3.74 | | |

Figures 14A, 14B:
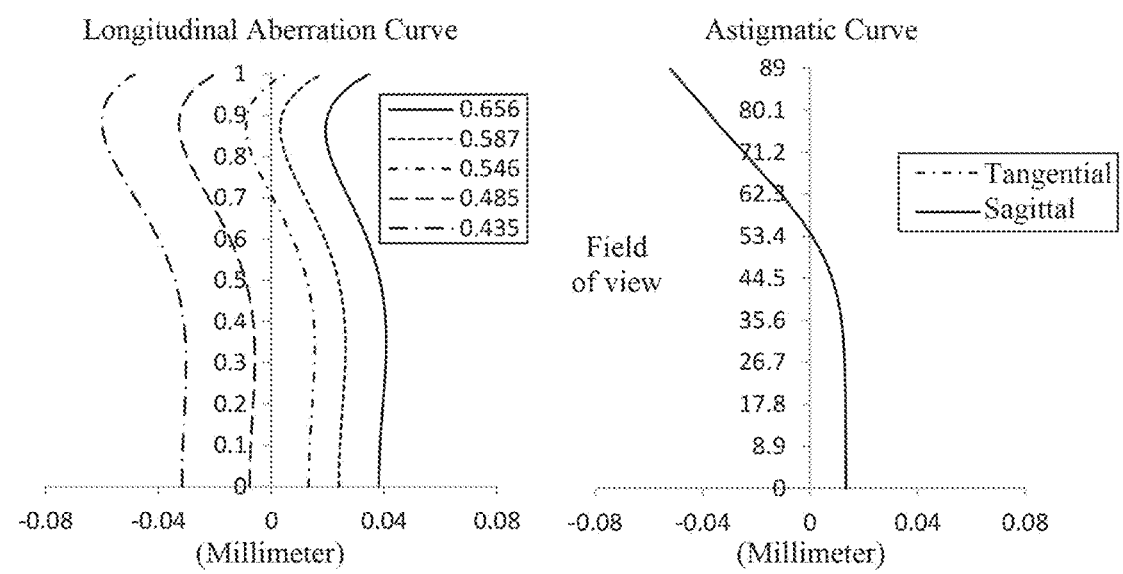
FIGS. 14A-14D illustrate a longitudinal aberration curve, an astigmatic curve, a distortion curve and a lateral color curve of the optical imaging lens assembly according to embodiment 7, respectively.
Figure 14C:
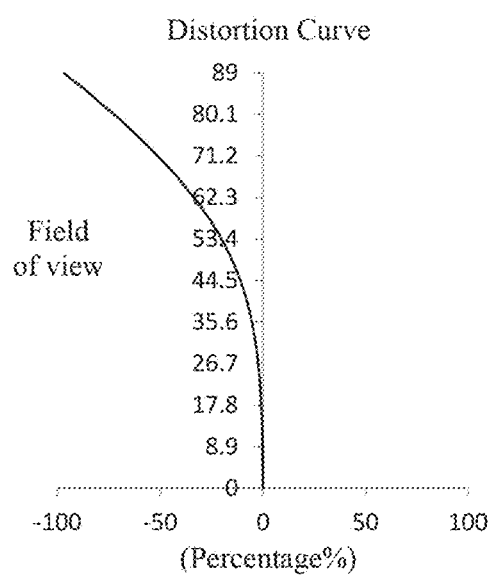
Figure 14D:
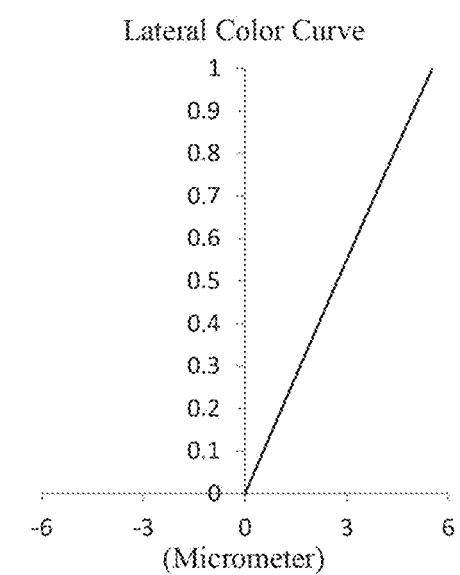

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatic curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion corresponding to different field-of-view angles. FIG. 14D illustrates a lateral color curve of the optical imaging lens assembly according to embodiment 7, representing deviations of different image heights on an image plane after light passes through the optical imaging lens assembly. It can be seen from FIG. 14A to FIG. 14D that the optical imaging lens assembly provided in embodiment 7 can achieve good image quality.

In view of the above, embodiments 1 to 7 respectively satisfy the relationship shown in Table 22.

TABLE 22

| | Embodiment | | | | | | |
|---|---|---|---|---|---|---|---|
| Condition | 1 | 2 | 3 | 4 | 5 | 6 | 7 |
| TTL/P*10 | 1.10 | 1.29 | 0.74 | 1.51 | 1.19 | 0.89 | 1.45 |
| \|RLS2/RLS1\| | 1.76 | 0.87 | 0.57 | 0.04 | 0.85 | 0.28 | 1.99 |
| f/EPD | 2.97 | 2.25 | 2.11 | 2.16 | 1.94 | 1.48 | 1.96 |
| \|f/f1\| | 0.13 | 1.13 | 1.10 | 1.10 | 0.56 | 0.88 | 0.13 |
| \|f/R1\| | 0.55 | 0.59 | 0.76 | 2.28 | 0.02 | 2.34 | 0.10 |
| DT12/DT11 | 0.33 | 1.25 | 1.13 | 0.96 | 0.72 | 0.93 | 0.58 |
| ΣCT/TTL | 0.51 | 0.45 | 0.48 | 0.43 | 0.46 | 0.58 | 0.55 |
| HFOV (°) | 50.5 | 35.8 | 43.0 | 40.2 | 60.2 | 36.8 | 102.1 |

The present disclosure further provides an imaging apparatus, having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device, such as a mobile phone. The imaging apparatus is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side along an optical axis, comprising: a first lens and at least one subsequent lens having refractive power, wherein, $0.6 < (TTL/P)*10 < 1.51$, where TTL is a distance along the optical axis from an object-side surface of the first lens to an image plane of the optical imaging lens assembly, and P is a distance along the optical axis from a to-be-captured object to the object-side surface of the first lens;

$0.55 < |f/R1| < 2.6$, where f is a total effective focal length of the optical imaging lens assembly, and R1 is a radius of curvature of the object-side surface of the first lens; and $0.3 < DT12/DT11 < 1.6$, where DT12 is an effective aperture radius of an image-side surface of the first lens, and DT11 is an effective aperture radius of the object-side surface of the first lens.

2. The optical imaging lens assembly according to claim 1, wherein among the first lens and the at least one subsequent lens, an object-side surface of a lens closest to the image plane of the optical imaging lens assembly is a convex surface.

3. The optical imaging lens assembly according to claim 2, wherein among the first lens and the at least one subsequent lens, |RLS2/RLS1|≤2.0,
where RLS2 is a radius of curvature of an image-side surface of the lens closest to the image plane of the optical imaging lens assembly, and RLS1 is a radius of curvature of the object-side surface of the lens closest to the image plane of the optical imaging lens assembly.

4. The optical imaging lens assembly according to claim 2, wherein the at least one subsequent lens includes a second lens, and an object-side surface of the second lens is a convex surface.

5. The optical imaging lens assembly according to claim 2, wherein the at least one subsequent lens, sequentially from the object side to the image side along the optical axis, includes a second lens, a third lens and a fourth lens, and an object-side surface of the fourth lens is a convex surface.

6. The optical imaging lens assembly according to claim 1, wherein 0.1<|f/f1|<1.3,
where f is a total effective focal length of the optical imaging lens assembly, and f1 is an effective focal length of the first lens.

7. The optical imaging lens assembly according to claim 1, wherein f/EPD≤3.0,
where f is a total effective focal length of the optical imaging lens assembly, and EPD is an entrance pupil diameter of the optical imaging lens assembly.

8. The optical imaging lens assembly according to claim 1, wherein 0.2<ΣCT/TTL<0.7,
where ΣCT is a sum of center thicknesses along the optical axis of the first lens and the at least one subsequent lens, and TTL is a distance along the optical axis from the object-side surface of the first lens to the image plane of the optical imaging lens assembly.

9. The optical imaging lens assembly according to claim 1, wherein 33°<HFOV<103°,
where HFOV is half of a maximal field-of-view angle of the optical imaging lens assembly.

* * * * *